United States Patent [19]

Tesch

[11] 4,101,202

[45] Jul. 18, 1978

[54] VARIFOCAL CAMERA OBJECTIVE WITH ADJUSTMENT-RANGE SELECTION

[75] Inventor: Karl Tesch, Bad Kreuznach, Germany

[73] Assignee: Jos. Schneider & Co. Optische Werke, Bad Kreuznach, Germany

[21] Appl. No.: 749,332

[22] Filed: Dec. 10, 1976

[30] Foreign Application Priority Data

Dec. 12, 1975 [DE] Fed. Rep. of Germany ....... 2555953

[51] Int. Cl.² ............................................. G02B 15/18
[52] U.S. Cl. .................................................. 350/187
[58] Field of Search .......................................... 350/187

[56] References Cited

U.S. PATENT DOCUMENTS

| 1,950,166 | 3/1934 | Durholz ................................. 350/187 |
| 3,994,572 | 11/1976 | Vesugi et al. ..................... 350/187 X |

*Primary Examiner*—Paul A. Sacher
*Attorney, Agent, or Firm*—Karl F. Ross

[57] ABSTRACT

A varifocal camera objective, having a rotatable control ring for adjustment to a desired focal length in a zoom range and to a closeup position in a macro range, is provided with a pair of independently settable stop members for selectively limiting the adjustability to less than the entire zoom range and for optionally excluding the macro range. The stop members coact with edges of a stepped recess in a rim of the control ring and are each indexable in an advanced and in a retracted position.

4 Claims, 1 Drawing Figure

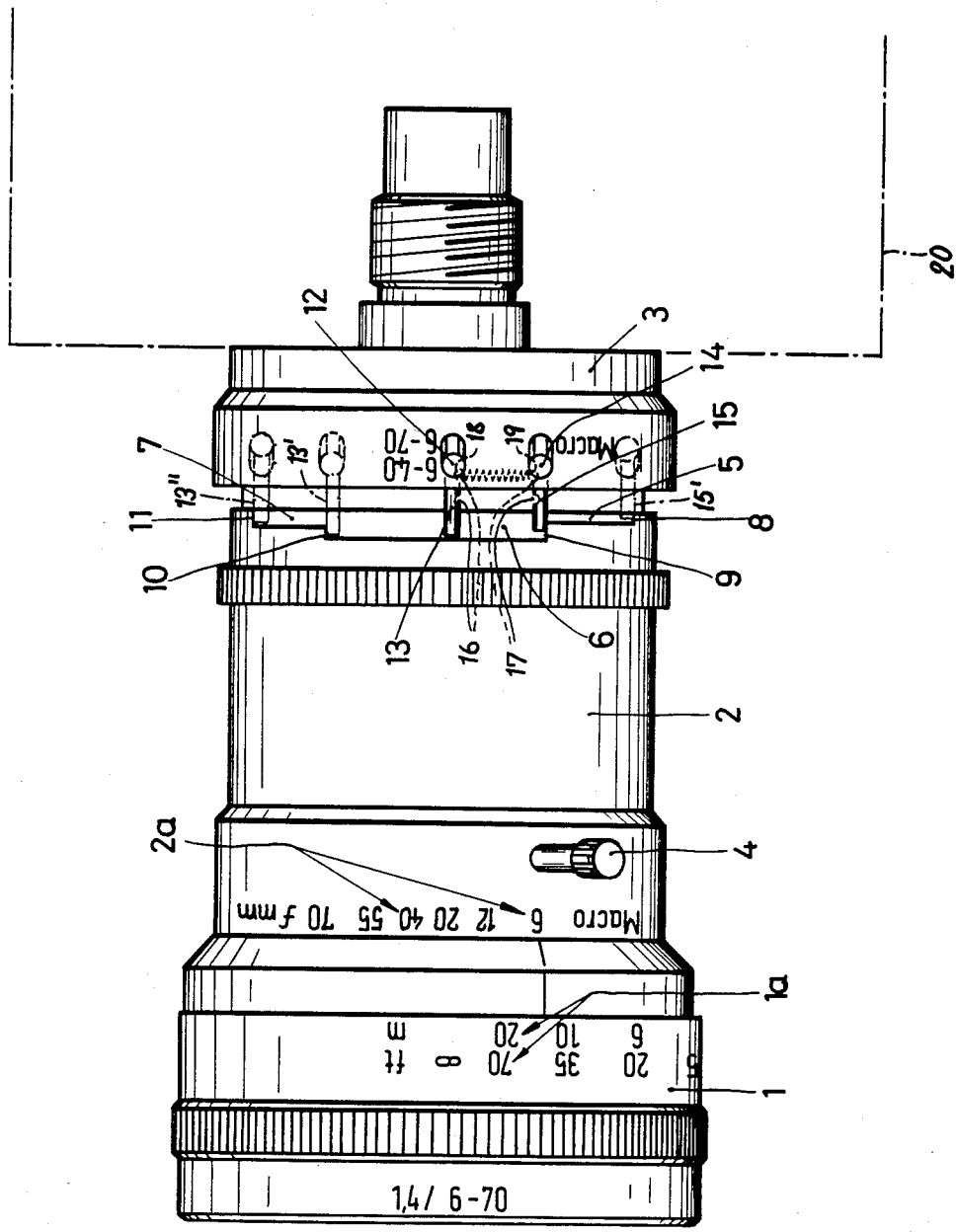

VARIFOCAL CAMERA OBJECTIVE WITH ADJUSTMENT-RANGE SELECTION

FIELD OF THE INVENTION

My present invention relates to a photographic or cinematographic camera equipped with a varifocal or zoom objective and with displaceable control means, such as a ring rotatable about the objective axis, for selecting a desired focal length within the zoom range as well as for focusing the camera upon a nearby object in a so-called macro range.

BACKGROUND OF THE INVENTION

The well-known varifocal objectives have a pair of axially shiftable components whose displacement with the aid of a camming ring changes the overall focal length from a maximum value in a telephoto position to a minimum value in a wide-angle position. It is also known to design the camming mechanism in such a way that further rotation of the ring beyond the wideangle position will move only one of these shiftable components to displace the previously stationary image plane so as to permit the taking of closeups in the macro range which is usually defined as encompassing image ratios between 1:10 and 1:1.

While it is convenient to have a single control element available for both zooming and closeups, it is frequently desirable to prevent an accidental overshooting of the zoom range when the object or scene to be filmed or photographed is distant from the camera. Furthermore, working near the telephoto end of the zoom range generally requires a steadier support for the camera in order to prevent objectionable blurring, making it desirable to limit the extent of the varifocal adjustment when no tripod or the like is available. It is also known to provide varifocal objectives with diaphragms which automatically increase the relative aperture with changes in the focal length, e.g. from a midposition of the zoom range to the telephoto position. In this case, again, it may be undesirable under certain lighting conditions to move beyond the position where the relative aperture begins to grow larger.

It has already been proposed (see German Pat. No. 1,169,280) to provide a zoom-type camera with a stop which arrests a camming ring in an intermediate position unless the user makes a special effort to deactivate that stop. This mode of operation requires a higher degree of alertness on the part of an operator wishing to utilize the full zoom range.

OBJECT OF THE INVENTION

It is, therefore, the object of my present invention to provide means in such a photographic or cinematographic camera for enabling the operator to select beforehand the extent of the range of adjustment he wants to use, thereby allowing him to concentrate entirely on the normal tasks of focusing and zooming without paying special attention to the self-imposed range limitations.

SUMMARY OF THE INVENTION

I realize this object, in accordance with my present invention, by the provision of first and second stop means selectively settable independently of each other to coact with a camming ring or other control means for blocking movement thereof from the wide-angle position to the telephoto position beyond a predetermined intermediate position and away from the telephoto position past the wide-angle position, respectively.

BRIEF DESCRIPTION OF THE DRAWING

The above and other features of my invention will now be described in detail with reference to the accompanying drawing, the sole FIGURE of which shows a varifocal camera objective embodying the present improvement.

SPECIFIC DESCRIPTION

The drawing shows, diagrammatically, a camera 20 having a rear lens mount 3 fixedly secured thereto, this lens mount carrying a nonillustrated fixed-focus lens group supplemented by a varifocal front attachment of conventional type disposed within a housing. Rotatably mounted on this housing is a focusing ring 1 with a distance scale 1a, graduated in meters and feet, and a control ring 2 provided with a handle 4, carrying a focal-length scale 2a graduated in millimeters. In the illustrated embodiment, the zoom range extends from a wide-angle position with $f = 6$ mm to a telephoto position with $f = 70$ mm. Scale 2a also indicates, adjacent the lower limit of the zoom range, a macro range to which the objective can be adjusted by an upward movement of knob 4 beyond the illustrated wide-angle position.

In accordance with my present invention, control ring 2 has an annular end face proximal to lens mount 3 which is formed with a stepped recess 6. The deepest part of this recess is bounded by edges 9 and 10, a shallower extension 7 of the recess terminating at an edge 11. On its opposite side the recess 6 has a still shallower extension 5 bounded by an edge 8.

Two stop members 13 and 15 in the form of axially extending pins are lodged in lens mount 3 and are provided with actuating knobs 12 and 14 received in slots of that lens mount in order to facilitate a shifting of these pins between an advanced position at left and a retracted position at right. The pins can be indexed in either of their positions by respective spring-loaded ball checks 18 and 19 engaging in notches 16 of pin 13 and notches 17 of pin 15. With pin 13 in its advanced position, as illustrated in full lines, the zoom range is curtailed to end in the 40-mm position in which the pin comes to rest against edge 10 as indicated in phantom lines at 13'. With pin 15 advanced, as also shown in full lines, the upward movement of handle 4 is stopped in the wide-angle position in which this pin abuts the edge 9. Retraction of pin 13 opens up the full zoom range from 6 to 70 mm, the pin engaging the edge 11 in the telephoto position as indicated in phantom line at 13". The macro range is available upon retraction of pin 15 which then engages the edge 8 as indicated in phantom lines at 15'. Recess edges 8 and 11 could also be replaced by lugs projecting from ring 2 toward lens mount 3.

Obviously, the peripheral separation of pins 13 and 15 along the recessed end face of ring 2 must be at least equal to the angular extent of the macro range if the end of that range is to be determined in the aforedescribed manner by the coaction of pin 15 with edge 8. With edge 9 higher than edge 10, however, the macro range could also be limited by contact between edge 9 and pin 13 in either its advanced or its retracted position. In either case, the two stop pins 13 and 15 allow a preliminary selection to be made among four different working modes, namely:

(a) full zoom plus macro range, (b) curtailed zoom plus macro range,
(c) full zoom without macro range,
(d) curtailed zoom without macro range.

With the objective focused on the macro range, the advance of pin 15 is prevented by the bottom of recess extension 5. Similarly, pin 13 cannot be advanced in the upper part of the zoom range in which it confronts recess extension 7.

While the embodiment described above is designed for manual adjustment of ring 2, it will be apparent that the same range limitations can be selectively imposed if the ring is electrically driven by a reversible motor through the intermediary of a friction clutch, e.g. as described in commonly owned U.S. Pat. Nos. 3,165,044, 3,656,422 and 3,682,072.

I claim

1. In a camera having a varifocal objective provided with control means displaceable between a telephoto position and a wide-angle position for adjusting the focal length of the objective in a zoom range, said control means being further displaceable beyond said wide-angle position for focusing the objective upon nearby objects in a macro range, the combination therewith of:

first stop means coupled with said objective and selectively settable to coact with said control means for blocking movement thereof from said wide-angle position toward said telephoto position beyond a predetermined intermediate position; and second stop means coupled with said objective and selectively settable independently of said first stop means to coact with said control means for blocking movement thereof away from said telephoto position past said wide-angle position.

2. The combination defined in claim 1 wherein said control means comprises a manually rotatable ring centered on the objective axis, said first and second stop means comprising a pair of axially shiftable members engageable with abutments on said ring.

3. The combination defined in claim 2 wherein said ring has an annular end face provided with a stepped recess with edges constituting said abutments, said members are peripherally spaced along said ring face within the bounds of said recess.

4. The combination defined in claim 2 wherein said members are provided with indexing means for alternate retention in an advanced position and in a retracted position.

* * * * *